Jan. 31, 1967 M. A. ODOM 3,301,961

AUTOMATIC TELEPHONE CALL TRANSLATING AND FORWARDING APPARATUS

Filed April 9, 1963 4 Sheets-Sheet 1

Inventor
Martin A. Odom
By Philip A. Friedell
Attorney

Jan. 31, 1967 M. A. ODOM 3,301,961

AUTOMATIC TELEPHONE CALL TRANSLATING AND FORWARDING APPARATUS

Filed April 9, 1963 4 Sheets-Sheet 2

Inventor
Martin A. Odom
By Philip A. Friedell
Attorney

INVENTOR
MARTIN A. ODOM
BY Philip A. Friddle
ATTORNEY

INVENTOR
MARTIN A. ODOM
BY Philip A. Friedell
ATTORNEY

United States Patent Office 3,301,961

Patented Jan. 31, 1967

3,301,961
AUTOMATIC TELEPHONE CALL TRANSLATING AND FORWARDING APPARATUS

Martin A. Odom, 302 Oakland Ave., Oakland, Calif. 94611

Filed Apr. 9, 1963, Ser. No. 271,626
6 Claims. (Cl. 179—18)

This invention relates to improvements in means for translating a telephone call from a given telephone number over a called telephone and its transfer though a different telephone number for forwarding to a remote location over another service line to a second telephone, and is a modification of the mechanical elements of my copending application Serial Number 215,245, filed August 6, 1962.

This invention eliminates considerable of the apparatus of the copending application mentioned, such as the electromagnetic actuating and driving devices, traversing devices, wiper switches, a conventional telephone dial, and other elements, all of which are replaced by a single, motor driven dialing element.

As in the previously mentioned application, controls and diverting elements are principally of the electromagnetic type, such as relays, which however, in the present case, are under electronic controls.

In this modification, control of dialing is not governed by adjustable stops for limiting the degree of winding of the conventional telephone dial for each respective digit, instead each digit selector is provided with a semi-circular series of electrical wipers and connections, and selective series circuit completing means for providing completed circuits only through the number of wipers conforming to the specific digit to which the digit selector is adjusted. If all digit selectors are set to the neutral indication, there will be no dialing or pulsing operation, irrespective of the condition of the circuit.

Each digit selector has its wipers in circuit with an equal number of commutator bars in a predetermined segment of the motor driven commutator type dialing apparatus, there being segments in number equal to the maximum number of digits to be dialed; however, irrespective of the maximum number, any lesser number of digits can be dialed at will, by merely leaving the remainder of the selectors adjusted to the neutral position.

Electronic supervisory circuits measuring amplitude, periods of signal duration, and brief periods of signaling variable in amplitude, exclude busy, reorder, line noise, office connecting pulses, multifrequencies, secondary trunk pulse sending and similar interferences.

In addition, the circuit electronically controls time delay, ring-back, answer, and hang-up.

Time delay, ring-back, answer and hang-up controls dial tone detector, etc., are electronically controlled.

The objects and advantages of the invention are as follows:

First, to provide a telephone call diverter with the simplest structure and arrangement of digit selection and re-dialing apparatus.

Second, to provide a diverter as outlined in which each digit selector is in direct electrical circuit with its specific segment or sector of the dialing means, and thereby forming an integral element of the redialing apparatus.

Third, to provide a diverter as outlined in which the dialing apparatus is of the commutator and brush type for providing the digit pulses.

Fourth, to provide a diverter as outlined in which redialing is controlled and actuated by a single, motor driven redialing unit.

Fifth, to provide electronic circuits for supervising the diverter until the loop circuit is completed and free of interference, such as dial tone, busy signal, or the like.

Sixth, to provide a diverter as outlined with two service lines, one or both of which may be provided with a telephone set with the other of the sets being removable at will without disrupting or in any way affecting operation of the diverter or the retained telephone set.

Seventh, to provide a diverter as outlined in which the second service line is normally dead ended when without telephone set installation.

In describing the invention reference will be had to the accompanying drawings, in which:

FIG. 1 covers the initial portion of the complete circuit diagram for the invention.

Figure 1:
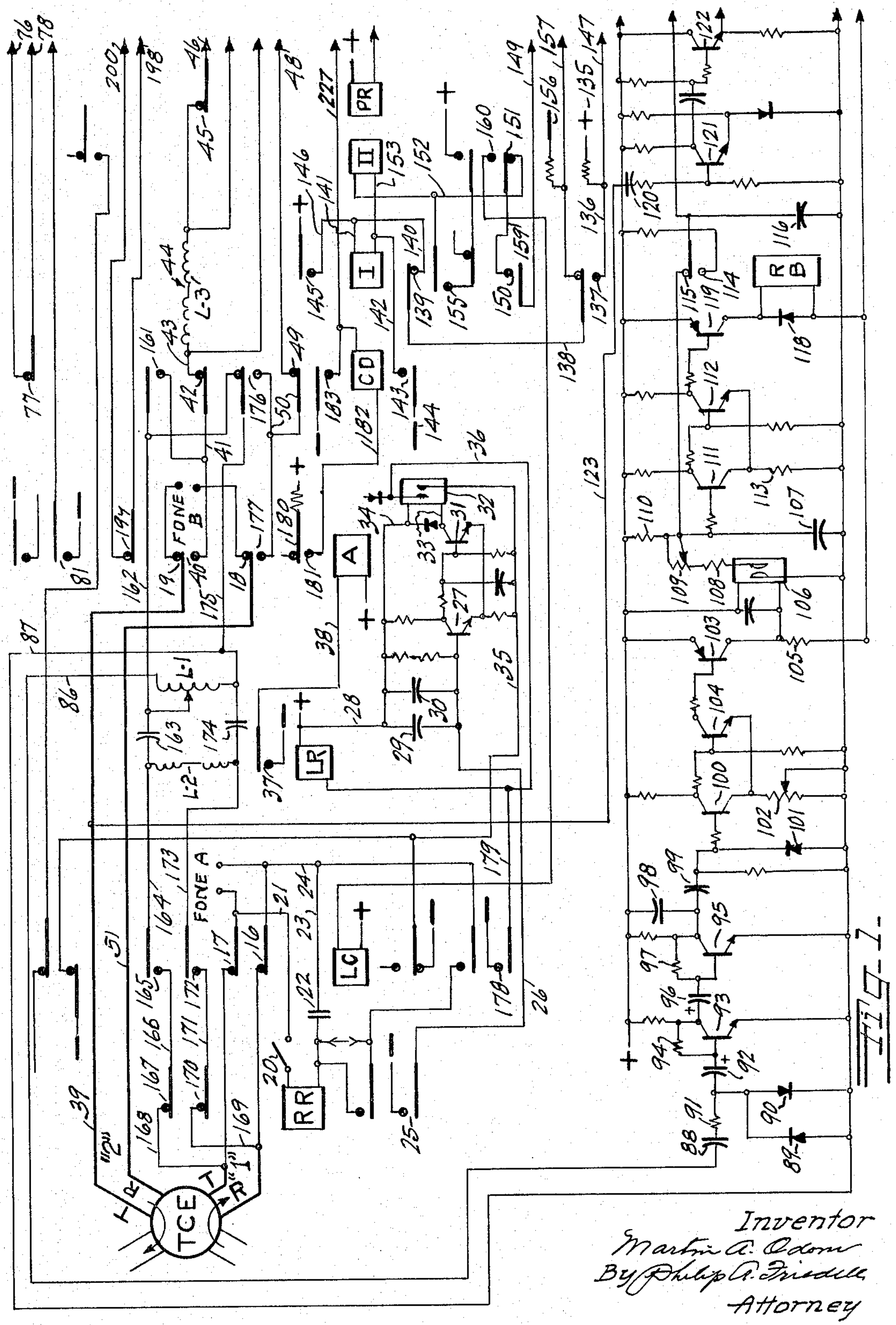

This invention requires two service lines from the central telephone exchange, one or both may be equipped with a telephone set to permit their conventional use under normal conditions, the two service lines being indicated "1" and "2," with each indicated as to tip side T and ring side R, and the central exchange being indicated "TCE," in the circuit diagram.

Also required is a source of direct current, which may be a battery or rectified A.C. current and, a source of alternating current, respectively for operation and control of the call diverting circuit, and for operation of the driving motor for the automatic dialing apparatus, though not so limited, as a direct current motor could be used.

The source of direct current is indicated as consisting of a battery 10 having a negative pole 11 which is connected to ground or chassis, and a positive pole 12, protected by a fuse 13, and manually controlled by a switch 14.

For diagrammatic simplicity, all negative connections are shown with the negative symbol "—," while all positive connections are shown with the positive symbol, "+," with the switch 14 closing to contact 15.

With switch 14 open, with both telephones equipped with sets, both operate normally for incoming and outgoing calls, though through a diverted circuit, line "1" circuit being completed through the normally closed relay switches 16 and 17, and line "2" circuit being completed through normally closed relay switches 18 and 19. Thus the subscriber has normal two-line service just as though each telephone was connected directly through its drop block in normal service installations.

When line "1" alone is equipped with a set, telephone A will operate normally while line "2" remains dead-ended, and thereby differentiates from known diverters where both service lines are connected to one telephone set.

By closing the battery switch 14 and the manual A.C. switch 14AC, the circuit is in position for diverting calls to any desired location, local or long distance, by having the digit selectors adjusted to the desired forwarding telephone number, and closing switch 20, which completes a parallel circuit through connection 21, switch 20, relay RR, condenser 22, and connection 23, 24 to telephone set A thus applying the ringing current to fone A and to relay RR. It will be noted that switches 14, 14AC, and 20 can be combined in a triple pole single throw switch for simultaneous closing and opening of the switches.

Energization of relay RR closes switch 25 from battery negative to a time delay circuit which maintains the transfer operation through the intervening periods between rings, this switch 25 closing circuit through connection 26, to the base of transistor 27.

The other side 28 of this circuit is connected to battery positive. Discharge of capacitors 29 and 30 applies a potential to the base of transistor 27, causing it to cease its normal conduction and thereby being bypassed to base bias transistor 31, resulting in conduction therethrough.

With transistor 31 conducting, a current is established in the coil of reed relay 32 through connections 33 and 34 thence to battery positive through connection 28. The current so established closes the contacts of reed relay 32.

At the end of each ring, relay RR is de-energized, interrupting the positive potential through relay switch 25 and connection 26 to the time delay circuit. There is sufficient time elapse, during the charging period of the condensers 29 and 30, to maintain the current through reed relay 32 from transistor 31 to bridge the interval between the pulses of the ring relay RR. A constant potential is thus maintained through the series of ring pulses, through connection 35, through contacts of reed relay 32, through connection 36, relay LR to the battery positive to energize relay LR.

With relay LR energized relay switch 37 is closed, completing circuit from battery positive, through relay A, connection 38, closed contact 37, to negative, thus energizing relay A, and thereby reversing all relay switches shown in axial alignment therewith.

The central office loop designated T and R, line "2" is now closed through the call diverter circuit for dialing, from T of line "2," through connection 39, relay switch contact 40, connection 41, normally closed relay switch 42, connection 43, dial tone coil 44, pulse springs 45, connection 46, normally closed relay switch 47, connection 48, relay switch 49, connection 50, relay switch contact 177, closed by relay A and thence connection 51, to the side R of line "2."

The dial tone detector is connected across dial tone coil 44 also indicated as L–3. When a dial tone is transmitted from the central office over line "2" as that circuit is completed, the dial tone will be amplified, parallel capacitances 52 and 53 couple the signal across the potentiometer 54 which functions as a gain control, through a capacitance 55 to the base of the common emitter amplifier 56. A resistor 57 establishes the bias to the base of transistor 56 while resistor 58 functions as a collector load for the transistor 56.

The amplified signal at the collector of transistor 56 is coupled through condenser 59 to the base of transistor 60, the bias being established by resistor 61, while resistor 62 provides the collector load for this stage, and condenser 63 serves as a bypass to limit high frequencies which may reach the collector of transistor 60 from reaching the base of transistor 64.

The collector of transistor 60 is connected to the base of transistor 64 through a capacitance 65 and a diode 66 in series, and a bias voltage is established for the base of transistor 64 through a diode 67 having connection from a point between the capacitance 65 and diode 66 to the base of transistor 64.

Alternating current applied to the collector of transistor 60 is rectified by the diodes. The positive pulses control the charge across condenser 68 which is connected in parallel with resistor 69, to the base of transistor 64. When the positive charge on the base side of condenser 68 exceeds a predetermined value, transistor 64 is cut off, with the collector of transistor 64 reversing the polarity to negative, with the negative signals producing a bias change to transistor 70, causing it to conduct.

Relay DT is connected in series parallel with the diode to the collector of transistor 70, with resistors 72, 73 and 74 functioning as a voltage divider for transistors 64 and 70, the diode 71 rectifying any stray currents and protecting transistor 70 against surging voltages due to decay current in relay DT.

Energization of relay DT closes switch 75 to complete circuit from battery positive at 15, through relay BCO, connection 76, normally closed relay switch contact 77, connection 78, contact 75, closed by relay DT connection 79, normally closed relay switch contact 80, and relay switch contact 81 which is normally open, but now closed by relay A to battery negative.

Energization of relay BCO closes switch 82, completing circuit from one side 83 of a source of alternating current, to the commutator dial motor 84, to the other side of the A.C. line, switch 14AC being closed for translating and dialing the forwarding telephone call.

Operation of motor 84 reverses switch 193, completing a circuit from battery negative at 194, through contact 225, contact 226 (closed by relay CA), connection 227, relay CD, connection 182, contact 181 (closed by relay A), to battery positive, energizing relay CD for one revolution of the cam 190.

Energization of relay CD is taken over through connection 180 from battery positive, contact 181 which is closed by relay, A connection 182, relay CD, contact 183 already closed through the previous circuit, to battery negative.

Means are provided for supervising the answer of the translated number, connecting the two lines for conversation, and disconnecting the lines following hang-up by either the called or calling party, and includes an autotransformer L-I with fixed center tap, with the supervisory circuit having connections 86 and 87 from the terminals.

A capacitor 88 isolates direct current from the supervisory electronic circuit, and the diodes 89 and 90 limit the input to one volt maximum, with resistor 91 absorbing any excess voltage, while the capacitor 92 couples the signal to the base of the first transistor 93, with resistor 94 establishing the bias thereon.

The first and second transistors, respectively 93 and 95 are common emitter amplifiers, and a capacitor 96 couples the A.C. voltage from the collector of transistor 93 to the base of transistor 95, which base in turn is biased by a resistor 97; random high frequency noise that may be present in the telephone lines being eliminated by the capacitor 98, while the capacitor 99 couples the A.C. voltage from the collector of transistor 95 to the base of transistor 100, the diode 101 maintaining the base of transistor 100 against a negative condition.

When an A.C. voltage is present on the collector of transistor 95, a positive voltage pulsation will be set up in the cathode of diode 101, and which pulsating current is coupled into the base of transistor 100 which is the first stage of a Schmitt trigger, the firing voltage of which is controlled by the potentiometer 102, and which potentiometer functions as a sensitivity control. The second stage 104 of the Schmitt trigger is also controlled by the potentiometer 102, the emitters of the two transistors being conneced in parallel to the potentiometer.

When the Schmitt trigger fires on impulses of ringback tone, transistor 103 will be turned off and the resistor 105 will cause the reed relay 106 to close its contacts, and will open and close with each pulse of the ring-back tone. When the reed relay contacts close, the capacitor 107 will discharge through the resistor 108 and potentiometer 109, and is normally charged through the resistor 110.

The positive plate of condenser 107 is connected to the input of the Schmitt trigger which includes the transistors 111 and 112, the emitters of which are connected in parallel through the resistor 113, and which trigger will fire whenever the voltage on the condenser 107 is below three volts, and will then energize the ring-back relay RB to complete circuit at 114, the circuit being normally closed to 115 which connects the 50 mfd. condenser 116 in parallel with the one mfd. condenser 107, causing a relatively long time delay before the RB relay closes. A diode 118 protects transistor 119 against surging voltages due to decay current in relay RB and maintains a unidirectional current.

When the RB realy closes, the 50 mfd. condenser is quickly charged to ten volts and only the one mfd. condenser is left on the input to the Schmitt trigger, which will allow the RB relay to restore quickly at the end of the ring-back tone.

One side of the telephone line is connected through a 0.5 mfd. condenser 120 to the input of a common emitter amplifier 121, with the collector of this transistor coupled to the base of transistor 122 which is the input of a Schmitt trigger.

When a positive signal is applied to the connection 123, the common emitter amplifier stage will conduct, the base of transistor 121 will convert to negative and its emitter will follow negative and thus cause the Schmitt trigger to conduct and actuate transistor 124, transistor 125 being the second stage of the Schmitt trigger. The transistor 126 amplifies the signal and closes the reed relays 127 and 128, which in turn closes the circuit to relay AH, the three relays being baised by the diode 129, for protection of the transistor 126.

Upon closing of relay AH, the 15 mfd. condenser 130 will be discharged through the 1*k* resistor 131 upon breaking of the contact 132 as the AH relay closes the switch to contact 133, thus connecting the condenser 130 through a 1*k* resistor 134 to the collector of transistor 125. This creates a relatively long pulse period on the answer and hang-up periods as related to the off-hook and on-hook short pulses of the answered telephone.

The reed relay 128, on the answer and hang-up pulses charges the 50 mfd. condenser 116 to build up a high charge in the event of a busy signal, and thus will not permit energization of the RB relay.

After the dialing apparatus has dialed the selected number, the supervisory circuit will create circuit conditions to receive the answer and disconnect pulses only after the ringback relay RB has received a continuous signal for a sufficient time to identify the condition of the called telephone as ringing. Random clicks, multifrequency senders, busy tone, etc., preceding a ring-back condition are eliminated.

When the transfer or selected number answers, closing the line loop of that number, a pulse is generated of substantially higher amplitude than the surges at the beginning and end of a ring-back, or voltages, resulting from sound issued through the period of conversation over the completed connection.

A disconnect, breaking the line loop of the calling or called party, will generate another pulse of fast rise time and high amplitude, causing the AH relay to re-operate, disconnecting the two lines.

Energization of relay RB completes a circuit from battery positive at 135, through connection 136, contact 137 (closed by relay RB), connection 138, normally closed switcht 139 (under control of relay I), connection 140, connection 141, relay I, connection 142, relay switch 143 (closed by relay CD), to battery negative at 144.

Relay I is thereby energized, closing switch 145 from battery positive, through connection 146, connection 141, relay I, connection 142, switch 143, to battery negative, maintaining energization of relay I when the ring-back relay RB releases.

When relay AH is energized from an answer pulse, the momentary operation of this relay completes circuit from battery positive at 135, through connection 147, contact 148 (closed by relay AH), connection 149, switch 150 (closed by relay I), normally closed contact 151, connection 152, through relay II, connection 153, connection 142, closed switch 143, to battery negative 144, energizing relay II which completes a circuit from battery positive through contact 154 (closed by relay II), contact 155 (closed by relay I), connection 152 through relay II, connection 153, connection 142, contact 143, to battery negative at 144, maintaining energization of relay II after relay AH has released.

Both relays, I and II are now maintained in an energized condition through switch 143 maintained closed by energized relay CD.

Upon restoring after the answer pulse, relay AH releases contact 148 to cause completion of a circuit from battery negative at 156, through connection 157, normally closed contact 158, connection 149, switch 150 (closed by relay I), connection 159, contact 160 (closed by relay II), through relay LC to battery positive, energizing this relay, and which connects the two service lines "1" and "2" for conversation, and terminates the incoming line at coil L–2, terminating the ring.

This loop connection is established from the tip side T of line "2," through connection 39, contact 40 (closed by relay A), connection 41, contact 161 (closed by relay CD), connection 162, condenser 163, connection 164, contact 165 (closed by relay LC), connection 166, normally closed contact 167, and connection 168, to the tip side T of service line "1," through the calling subscriber's telephone, and back to the ring side R of service line "1," thence through connection 169, normally closed switch 170, connection 171, contact 172 (closed by relay LC), connection 173, condenser 174, connection 175, contact 176 (closed by relay CD), connection 50, contact 177 (closed by relay A), and connection 51 to the ring side R of service line "2," completing the conversation loop.

A circuit has been completed from battery negative through switch 178 (closed by relay LC), connection 179 through relay LR under control of relay LC, to battery positive, with relay LR maintaining energization of relay A through closing of contact 37, from negative connection 38, relay A to battery positive.

Relay CD maintains energization of relays I and II from battery negative through contact 143, connection 142, relay I, connection 141, contact 145, to battery positive. Relay II is maintained by relay CD from battery negative at 144, contact 143, connection 142, relay II, connection 152, contact 155, contact 154, to battery positive.

All connections so far made are under control of relay AH, which, in its normal condition maintains energization of relay LC from battery negative at 156, connection 157, contact 158, connection 149, contact 150, contact 160 (closed by relay II), through relay LC to battery positive.

When relay AH is momentarily energized by the disconnect pulse, contact 158 is momentarily opened to break circuit to relay LC, which, upon release of relay AH re-establishes the circuit and thereby restores all of the circuits.

If telephone sets are installed on both service lines, relay RR and telephone A are disconnected at relay switches 16 and 17, which are opened by the energized relay LC during the period of conversation.

Figure 8:
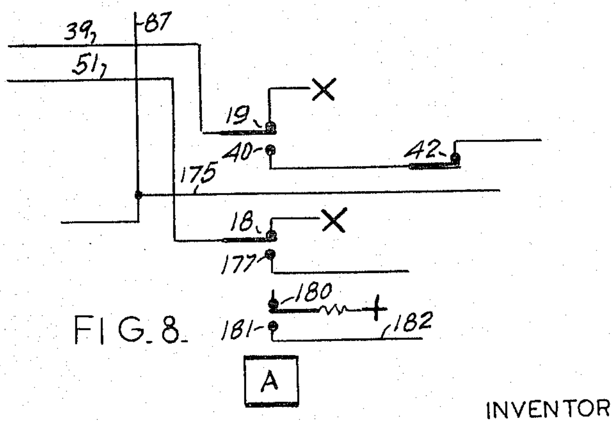
FIG. 8 is a fragmentary circuit diagram showing the dead-ended second service line when not equipped with a telephone set.

In many cases, the subscriber has no use for a second telephone set, and in others, the subscriber prefers to have the second service line remain clear for the diverting calls, in which case the second service line is normally dead ended as indicated at X X in FIG. 8, and having no effect on the remainder of the circuit, but permitting installation of the second telephone set at any desired time.

Telephone B is disconnected upon initiation of the transfer call when relay A operates through the timing circuits on an incoming ring, and is disconnected at 18 and 19.

The dial tone detector circuit and dial tone coil L–3 at 44, and the spark suppressor 184 are disconnected from the telephone lines when relay CD is energized, breaking circuits at 42 and 185.

The digit selector consists of a manually adjustable indicia bearing rotor for each digit, and includes an electrically conductive cam 186 for each rotor, the cam being fixed to the rotor for adjustment therewith.

A substantially semi-circular series of contacts or wipers are fixedly mounted and angularly spaced and normally clear the cam 186, when the cam is in one relative position, and selectively contacting the cam in the other position.

The cam 186 cooperates sequentially and, collectively in follow relation, with the respective wipers 187 of one digit selector to complete the negative end of the circuits.

Figure 2:
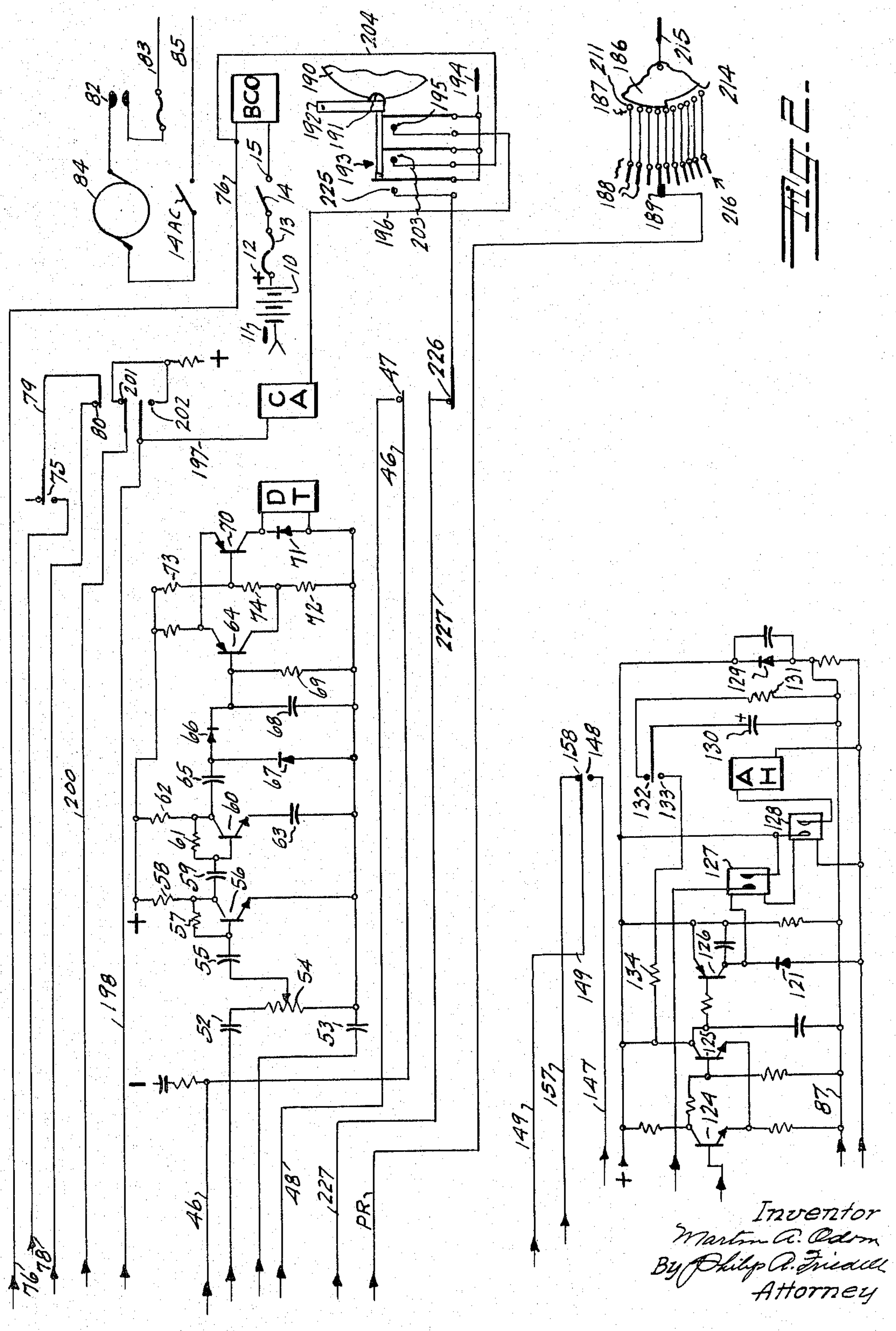
FIG. 2 is a continuation of the circuit of FIG. 1 and covers the remainder of the complete circuit diagram.
Figures 3, 4:
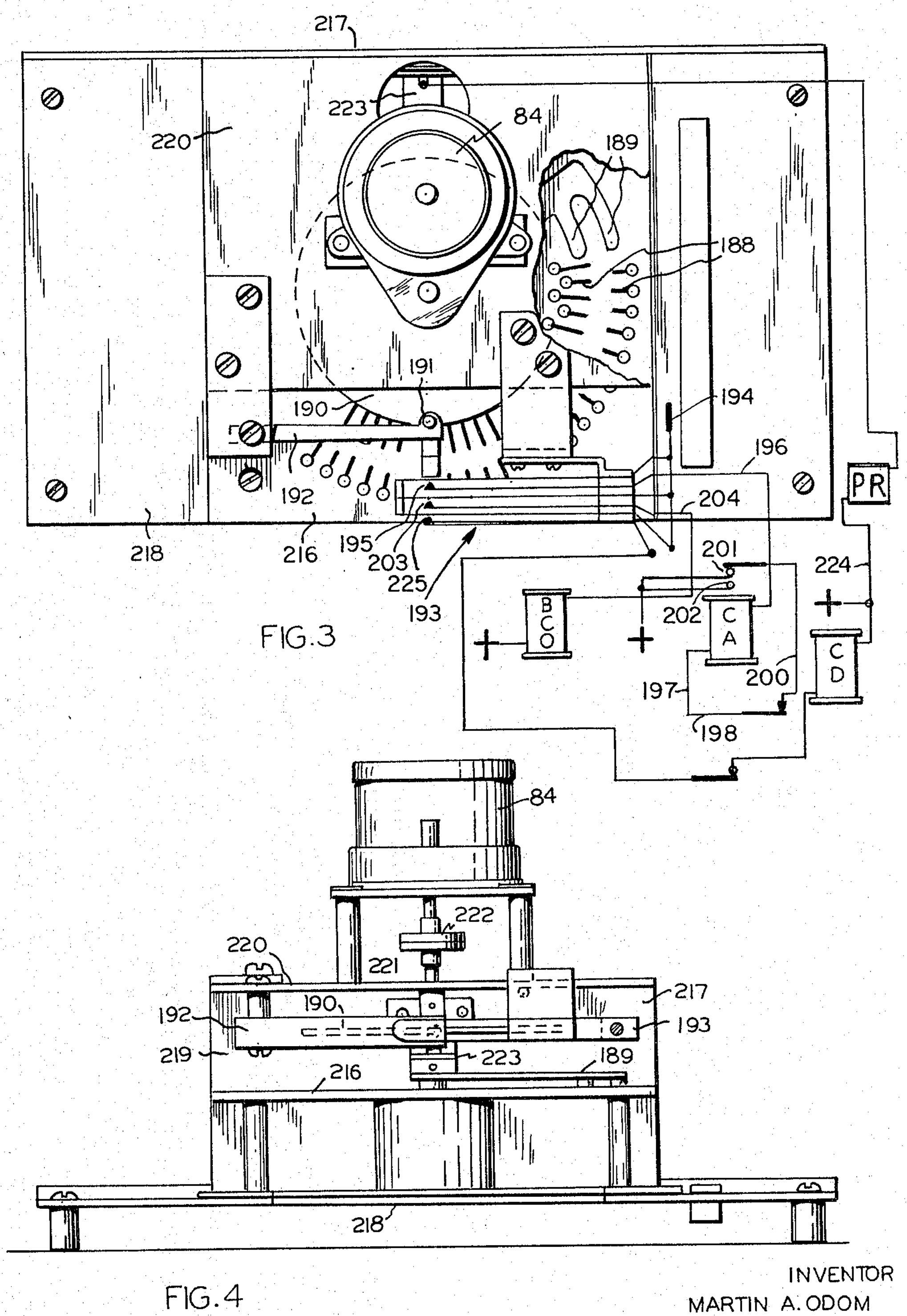
FIG. 3 is a top plan view of the re-dialing unit, with portions broken away to disclose the pulse bars or commutator and brush.
FIG. 4 is a front elevation of FIG. 3.
Figure 5:
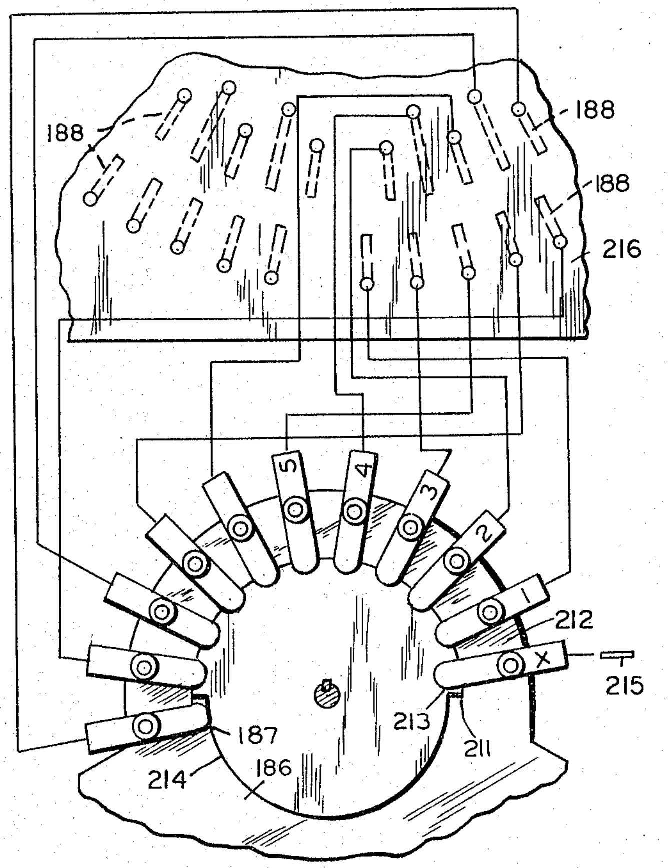
FIG. 5 is a fragmentary view of the inverted commutator and of one digit selector and including the electrical connections between the selector and the commutator.
Figure 7:
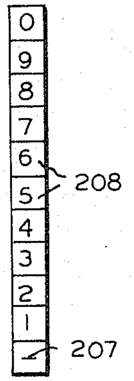
FIG. 7 shows the arrangement of the neutral point and the digits on the digit selector.
Figure 6:
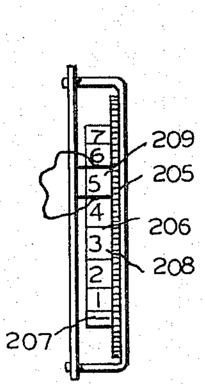
FIG. 6 is a front elevation of the digit selector.

These wipers 187 each have a terminal, with the respective terminals electrically connected to the respective commutator bars 188 of one segment of the commutator, as shown in FIGS. 2 and 5.

A brush 189 selectively and sequentially completes circuit only through the bars which are connected to wiper-shorted terminals showing 5 in FIG. 2 and 9 in FIG. 5, the other bars of any segment having incomplete circuits, without negative connection.

The brush 189 is dragged over the commutator bars by the motor 84, it being fixed on the shaft 221; brushing being initiated upon energization of relay BCO.

In addition to the movable brush, the motor also drives a cam 190 which is also fixed on the shaft 221 and is provided with a single recess 191 which receives a roller on the switch lever 192. Initial movement of the cam 190 moves the roller out of the recess and reverses the multiple switch 193, completing circuit from battery negative at 194, through contact 195, connection 196, relay CA connections 197 and 198, contact 199, connection 200, and contact 201 to battery positive, energizing relay CA which immediately completes circuit through connection 197 and contact 202 to battery positive.

The circuit is also completed from battery negative at 194, through contact 203, connection 204, to relay BCO, to battery positive, thus maintaining the circuit to the motor until the dialing operation has been completed, irrespective of any other interruptions in circuits.

When the cam 190 has completed one revolution, the roller drops back in the recess, with the multiple switch restoring to normal, placing control under the other elements of the complete circuit.

The digit selectors each include a disc 205 which is fixed to a drum 206 which is provided with a neutral indication 207, and a series of digits 208 ranging from 1 through 9 to 0, and only one of which is visible at any time through a window 209. The cam 186 has a high half portion 211 and a low half portion 214.

A base 212 is immovably mounted for cooperation with the cam and is provided with a series of eleven wipers, the initial one 213 being sufficiently long to maintain contact with the cam, and has a connection to battery negative as indicated at 215, while all of the others are short enough to contact only the high side. The cam is shown adjusted to the position for dialing the digit 9, since the wipers for digits 1 to 9 are contacting the high side and therefore have connection to ground through the cam and ground wiper 213. The remainder of the wipers, having no connection to battery negative, are non-operative.

These wipers are connected to one sector of the commutator 216, there being as many sectors as there are digit selectors, the underside of the commutator being shown for clearly disclosing the connections from the wipers to the bars. It will be noted that the bars are formed in two circular rows of different radii and staggered to keep the commutator to a minimum diameter, the bars being indicated at 188.

The re-dialing unit consists of a housing 217 having a base 218, a rear wall 219, and a top wall 220. A motor 84 is mounted above the top wall, and its shaft is connected to the cam and brush drive shaft 221 through a coupling 222 formed of electrical insulation, this shaft being insulated also from the housing, and having the cam 190, and the brush 189 fixedly mounted thereon for rotation therewith.

The commutator 216 is formed of electrical insulation and has narrow conductive bars 188 with ample spacing therebetween to set up the pulses through the brush 189, as the brush is passed through its circular path, this commutator being stationary while the brush is movable.

The brush passes through one revolution and breaks circuit to the motor when the roller drops back into the recess at 191, by releasing the multiple switch, breaking circuit through relay "BCO." A wiper 223 has its terminal end insulated from the housing and has one end riding on the brush hub and has connection with battery positive as indicated at 224, which completes circuit through only those bars which are connected to the wipers shorted to negative by the adjustable cam on the digit selectors. Thus, as shown for the one unit, the brush would set up pulses only with the first nine digits, and pass over the tenth without any effect, since there is no negative connection to digit "10."

With this circuit, the telephone set for service line "2" may be installed or removed at will without in any way affecting the operation of the call diverter, the connection or disconnection being carried out at X X in FIG. 8.

I claim:

1. An automatic call forwarding system for a subscriber's telephone installation having a first and a second line to the central exchange comprising, in combination, (a) a first signal detector coupled to said first line and responsive to incoming ringing signals thereon, (b) first switching means actuated by operation of said first signal detector to close the circuit of said second line, (c) a second signal detector responsive to dial tone on said second line, (d) a dialing impulse generator for transmitting a preselected sequence of dialing impulses over said second line, said dialing impulse generator being actuated by operation of said second signal detector, and (e) a second switching means coupling said first and second lines for transmission of voice signals therebetween following operation of said dialing impulse generator.

2. An automatic call forwarding system as defined in claim 1 further comprising a third signal detector responsive to answer and disconnect pulses on said second line and non-responsive to smaller amplitude signals thereon, said third signal detector being operatively coupled to said second switching means (e) for closing said second switching means following receipt of said answer pulse and subsequently opening said switching means following receipt of said disconnect pulse whereby said first and second lines are coupled for transmission of voice signals only after the telephone called on said second line has been answered and said first and second lines are uncoupled immediately after termination of the forwarded call.

3. An automatic call forwarding system as defined in claim 1 further comprising a ringback signal detector coupled to said second line responsive to ringing signals thereon following operation of dialing impulse generator (d), said ringback detector having an output coupled to said second switching means (e) to hold said second switching means open until said ringing signals on said second line have been detected.

4. An automatic call forwarding system as defined in claim 1 further comprising a third switching element coupled to said second signal detector (c) and operated by the output thereof following detection of said dial tone thereby to deactivate said second signal detector for the duration of the forwarded call.

5. An automatic call forwarding system as defined in claim 1 further comprising a line terminating coil and wherein said second switching means (e) couples said terminating coil to said first line following operation of said dialing impulse generator (d) terminating said incoming ringing signals on said first line.

6. In an automatic call forwarding system for a subscriber's telephone installation having a first and a second line to the central exchange, the combination comprising, (a) an electrical power source, (b) a rotary switch having a plurality of spaced apart contacts and a rotating wiper arm which traverses each of said contacts in sequence and having a motor driving said wiper arm, (c) a plurality of manually adjustable digit selectors each having an associated plurality of terminals, a selected number of which are connected to a first side of said power source by an appropriate setting of said digit selector, each of said terminals being connected to a separate one of said contacts of said rotary switch, (d) first switching means coupled to said second line and connecting the second side of said power source to said wiper arm of said rotary switch whereby said first switching means operates to generate a preselected sequence of dialing impulses on said second line upon operation of said rotary switch, (e) a first signal detector coupled to said first line and responsive to incoming ringing signals thereon for initiating operation of said driving motor of said rotary switch following receipt of said incoming ringing signals, (f) second switching means coupling said first and second lines for transmission of voice signals therebetween, (g) a second signal detector coupled to said second line for detecting an answer thereon, said second signal detector closing said second switching means to couple said first and second lines following detection of said answer and opening said second switching means following termination of the forwarded call, (h) a third signal detector coupled to said second line and responsive to dial tone thereon, and (i) a third switching means controlled by said third signal detector and connected between said first signal detector and said motor of said rotary switch whereby said first signal detector initiates operation of said rotary switch only after detection of dial tone on said second line by said third signal detector.

References Cited by the Examiner

UNITED STATES PATENTS 2,806,902 9/1957 Gutierrez ---------- 179—18 X

KATHLEEN H. CLAFFY, *Primary Examiner.*

WILLIAM C. COOPER, *Examiner.*

Dedication

3,301,961.—*Martin A. Odom*, Oakland, Calif. AUTOMATIC TELEPHONE CALL TRANSLATING AND FORWARDING APPARATUS. Patent dated Jan. 31, 1967. Dedication filed Jan. 3, 1972, by the assignee, *Ford Industries, Inc.*

Hereby dedicates to the Public the remaining term of said patent.

[*Official Gazette June 13, 1972.*]